July 6, 1948. W. K. CRESON 2,444,592
REVERSE BRAKE
Filed June 23, 1945 2 Sheets-Sheet 1
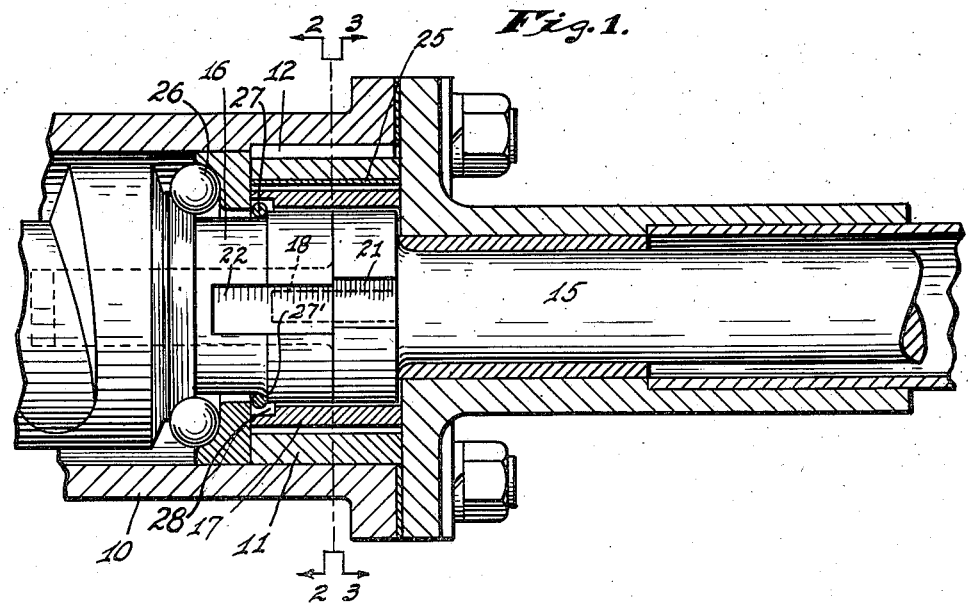
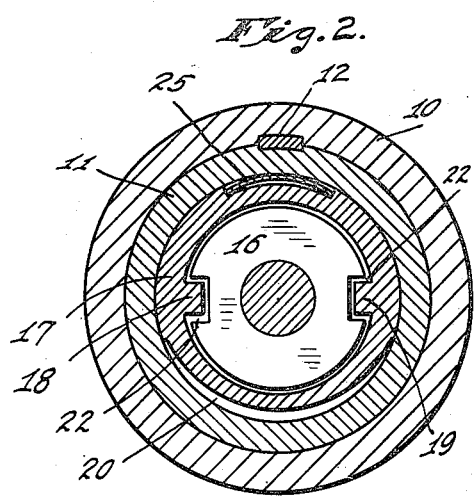
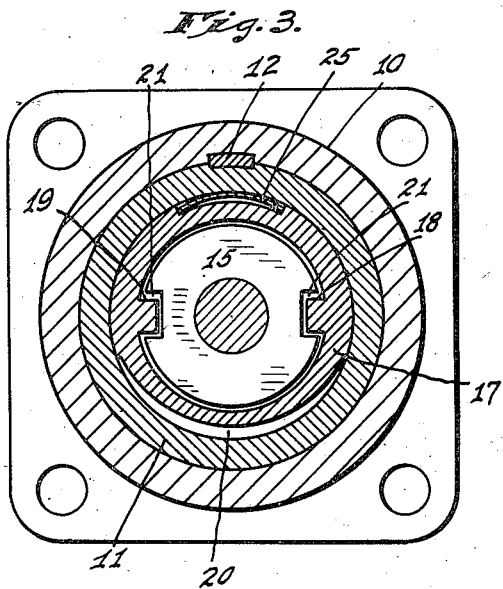
INVENTOR.
WILLIAM K. CRESON
BY
ATTORNEYS.

July 6, 1948.  W. K. CRESON  2,444,592
REVERSE BRAKE
Filed June 23, 1945  2 Sheets-Sheet 2
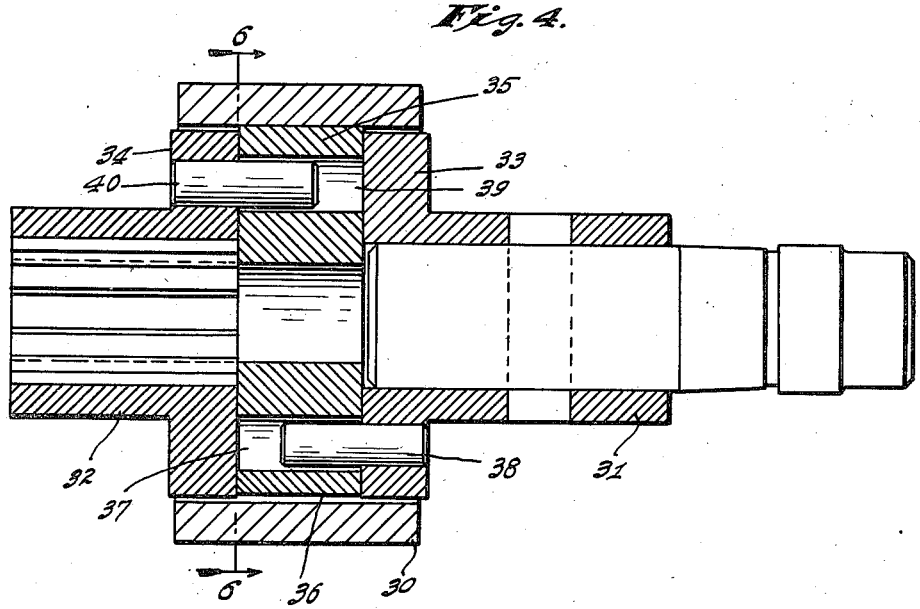
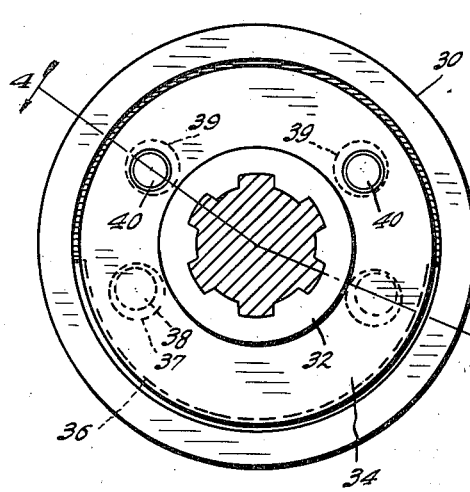
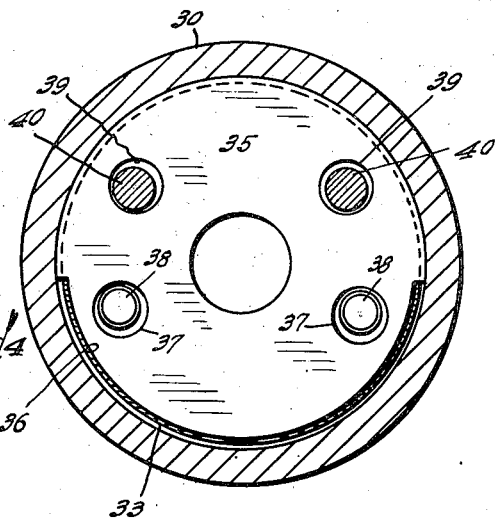
INVENTOR.
WILLIAM K. CRESON
BY
ATTORNEYS.

Patented July 6, 1948

2,444,592

UNITED STATES PATENT OFFICE 2,444,592

REVERSE BRAKE

William K. Creson, La Fayette, Ind., assignor to Ross Gear & Tool Co., La Fayette, Ind., a corporation of Indiana Application June 23, 1945, Serial No. 601,151

4 Claims. (Cl. 192—8)

My invention is concerned with a reverse brake for use in association with coaxial driving and driven members to prevent rotation of said two members under the influence of a torque applied to the driven member while permitting their free rotation when a torque is applied to the driving member. It is the object of my invention to produce a reverse brake which can be simply and economically manufactured and which will be adaptable for use in a wide variety of situations. A further object of my invention is to provide a reverse brake which while effective for its intended purpose in preventing rotation under the influence of a torque applied to the driven member will not sieze and may be quickly released when a torque is applied to the driving member.

In carrying out my invention I surround the juxtaposed ends of coaxial driving and driven members with a stationary sleeve. Within an annular space provided between this sleeve and the ends of the driving and driven members I dispose an annular brake member having a running fit within the sleeve and relieved exteriorly so as to be out of contact with the inner surface of the sleeve for an extent of somewhat less than 180°. The brake member has a lost-motion connection with each of the driving and driven members. The connection of the brake member with the driven member is of such a nature that any torque transferred from one to the other will impose on the brake member a reaction urging its relieved side toward engagement with the sleeve; while the driving member is so connected to the brake member that any torque transmitted between them will react on the brake member to urge its relieved side away from engagement with the sleeve. Because of the relief, the surfaces of brake member and sleeve forced into engagement by the reaction of the driven member on the brake member are nearly parallel. Accordingly, when an exterior torque is applied to the driven member, the brake member becomes wedged within the sleeve and will not rotate. On the other hand, the brake-member and sleeve surfaces forced into engagement by the reaction of the driving member on the brake member have sufficient angular extent to prevent any wedging action; and therefore, when an exterior torque is applied to the driving member, the brake member remains free to rotate and will drive the driven member as a result of the lost-motion connection between them.

The accompanying drawings illustrate my invention: Fig. 1 is an axial section through a reverse brake; Figs. 2 and 3 are transverse sections looking in opposite directions; Fig. 4 is an axial section, on the line 4—4 of Fig. 5, illustrating a modified construction; Fig. 5 is an end elevation of the brake of Fig. 4; and Fig. 6 is a section on the line 6—6 of Fig. 4.

The device illustrated in Figs. 1 to 3 comprises a stationary housing 10 within which a sleeve 11 is mounted. Rotation of the sleeve within the housing is prevented as by means of a key 12. Rotatably mounted with their ends in juxtaposed relation within the sleeve 12 are relatively rotatable driving and driven members 15 and 16, respectively. The juxtaposed ends of the driving and driven members are of approximately the same diameter, which is materially less than the interior diameter of the sleeve 11; and within the annular space thus provided there is disposed an annular brake member 17 having a running fit within the sleeve 11.

The brake member 17 is provided interiorly with two diametrically opposite, axially extending ribs 18 and 19; and the exterior surface of the brake member is relieved, as indicated at 20, symmetrically with respect to an axial plane normal to the axial plane of the ribs 18 and 19. The extent of such relief is somewhat less than 180°, and its purpose is to reduce to two relatively narrow and nearly parallel portions the exterior bearing area of the brake member on one side of the plane of the ribs 18 and 19.

The adjacent ends of the driving and driven members 15 and 16 are provided respectively with grooves 21 and 22 which receive the ribs 18 and 19 on the brake member. The grooves 21 and 22 are not co-planar with the ribs 18 and 19 but instead are offset with respect to such ribs, the grooves 22 in the member 16 being offset toward the relief 20 in the outer surface of the brake member and the grooves 21 in the member 16 being offset in the opposite direction. As a result of this offsetting, rotation of the driven member 16 in either direction will urge the relieved portion 20 of the brake member toward the adjacent portion of the sleeve 11, while rotation of the driving member 15 in either direction will urge such relieved portion away from the sleeve.

From the above description, it will be apparent that the ribs 18 and 19 provide a lost-motion connection between the driving and driven members permitting either member to rotate slightly relative to the other. If an exterior driving torque is applied to the driven member 16, it will rotate in the direction of such torque relative to the brake member 17 until the side wall of one of its grooves 22 engages the adjacent side of the associated rib on the brake member. As the result of this engagement, and before the lost-motion between the members 16 and 15 is taken up, the brake member 17 will be urged transversely of the sleeve 11 to force into engagement with the inner surface of the sleeve those portions of the outer surface of the brake member lying at the ends of the relief 20. These surface portions of the brake member converge at a relatively small angle, with the result that the brake member becomes wedged within the ring 11 and is thereby prevented from rotating to take up the remainder of the lost-motion between the driven element and the driving element. Thus, no torque is transmitted to the driving element by a torque applied to the driven element. On the other hand, if an exterior torque is applied to the driving element 15, it will rotate relative to the brake member 17 until the side wall of one of its grooves 21 engages the adjacent rib 18 or 19 to urge the brake member transversely of the sleeve 11 while applying a torque thereto. The surfaces on the brake member and sleeve thus forced into engagement have sufficient circumferential extent that no wedging action is produced, and the brake member remains free to turn. As it turns, the lost motion between the driving and driven elements will be taken up and thereafter the driving element will rotate the driven element.

I have found that the effectiveness of the brake member in preventing the driven member 16 from rotating the driving member 15 can be increased if it is biased toward its wedged condition within the sleeve 11. To so bias the brake member I provide a leaf spring 25 which lies in an exterior groove in the surface of the brake member opposite the relief 20 and which is so formed as to be stressed when in position, so that its ends will bear inwardly on the brake member while its mid-portion bears outwardly on the sleeve.

When the brake member 17 becomes wedged within the sleeve 11, as a result of an exterior torque applied to the driven member 16, the reaction of the sleeve upon the brake member tends to collapse the latter. As the result, the wedging action is effective only to the extent that the brake member resists collapse. By properly proportioning the brake member, the maximum braking effort which it is capable of exerting can be controlled and given any desired value. Collapse of the brake member permits additional rotation of the driven member 16 relative to the driving member 15; and if the extent to which the braking member can collapse is sufficient, lost motion between the driven and driving members will eventually be taken up and a torque transmitted from one to the other. However, the torque applied to the driving member in such circumstances will be less than the torque applied to the driven member by the amount of the torque resulting from friction between the brake member and the stationary sleeve.

In the particular device illustrated in Fig. 1, the driven member 16 is rotatably supported in the casing 10, through the medium of an antifriction ball bearing comprising an outer race 26. To hold the outer race 26 in operative position during assembly, thus preventing escape of the bearing-balls, I may employ a split spring ring 27 which has an outer diameter larger than the inner diameter of the race 26 and which engages an inwardly presented shoulder 27' on the driven element 16. If the presence of the ring 27 necessitates it, the inner end of the brake member 17 may be counterbored, as indicated at 28, to clear the ring. It is to be understood that the ring 27 and counterbore 28 form no part of my invention and that their presence in the construction shown does not in any way affect operation of the brake or of the device with which it is associated.

The modification of my invention shown in Figs. 4, 5, and 6 comprises a stationary sleeve 30 with which rotatable driving and driven members 31 and 32 are concentric. The driving and driven members are provided respectively with opposed flanges 33 and 34 between which there is disposed a brake member 35 having a running fit in the stationary sleeve 30. The outer surface of the brake member 35 is relieved for somewhat less than 180° as indicated at 36, thus resembling the brake member 17 of Figs. 1, 2, and 3.

Symmetrically disposed relative to the relief 36, and in the same half of the brake member as is that relief, the brake member is provided with a pair of spaced openings 37 each adapted to receive loosely a pin 38 rigid with the driving member. The other half of the brake member 35 is provided with two holes 39 symmetrically disposed relative to the relief 36 and adapted to receive respectively pins 40 rigid with the driven member 32.

As will be clear from Figs. 5 and 6, the angular distance between the two pins 40 is somewhat greater than the angular distance between the two holes 39, and the angular distance between the two pins 38 is somewhat greater than the angular distance between the two holes 37. Because of the loose fit of the pins within the holes, there is a certain amount of lost motion between the driving member 31 and the brake member 35 and additional lost motion between the brake member and the driven member. Since the pins 40 are offset toward the relief 36 from the centers of the holes 39 in which they are respectively received, any reaction of the driven member 34 on the brake member 35 will urge the relieved portion 36 of the brake member toward the adjacent portion of the inner surface of the stationary sleeve 30. Because of the relief 36, the surface portions of the brake member and sleeve thus forced into engagement with each other are nearly parallel to each other, and the brake member will thereby becomes wedged within the sleeve and prevented from rotating. On the other hand, upon rotation of the driving member 31 in either direction, one or the other of the pins 38 will engage the wall of its associated opening 37 and move the brake member in the opposite direction. The surface-portions of the brake member and sleeve thus forced into engagement are not parallel and no wedging results, the brake member therefore remaining free to rotate in the sleeve.

It is thus apparent that the device of Figs. 4, 5, and 6 operates in substantially the same manner as does the device of Figs. 1, 2, and 3. Torque transmitted between the driven member 32 and the brake member 35 urges the brake member toward its locked position, while torque transmitted between the driving member 31 and the brake member urges the latter toward released condition. Accordingly, if the driven member 32 tends to rotate under the influence of an exteriorly applied torque, the brake member 35 will be forced to its locked position and will prevent the torque from being transmitted to the driving member 31. On the other hand, if the exteriorly applied torque is imposed on the driving member 31, one or the other of the pins 38 will move the brake member to its released condition, thus enabling it to rotate with the driving member until all lost motion between the brake member and driven member is taken up, whereupon the driving member, brake member, and driven member will rotate as a unit.

I claim as my invention:

1. A reverse brake, comprising a stationary member having a circular bore, a brake member rotatable in said bore, said brake member being relieved exteriorly over somewhat less than half of its circumference, rotatable driving and driven members coaxial with said bore, said driven member having means engageable with said brake member to urge the relieved portion thereof toward engagement with the surface of said bore when said driven member rotates, said driving member having means engaging said brake member to urge it in the opposite direction when said driving member rotates, and yielding means acting between said brake member and said stationary member and urging the relieved portion of the brake member toward the bore-surface.

2. A reverse brake, comprising a stationary member having a circular bore, an annular brake member rotatable in said bore, said brake member being relieved exteriorly over somewhat less than half of its circumference, rotatable driving and driven members coaxial with said bore, said brake member being provided with opposite axially extending ribs disposed symmetrically relative to the relieved portion, each of said driving and driven members extending into said brake member and being provided with axially extending grooves loosely receiving said ribs, the grooves in said driven member being offset relatively to said ribs toward the relieved portion of the brake member and the grooves in the driving member being offset in the opposite direction relative to the ribs.

3. A reverse brake, comprising a stationary member having a circular bore, an annular brake member rotatable in said bore, said brake member being relieved exteriorly over somewhat less than half of its circumference, rotatable driving and driven members co-axial with said bore and extending into said brake member from opposite directions, a pair of abutments carried by said driven member and engageable with said brake member to urge the relieved portion thereof toward the surface of said bore when said driven member rotates in either direction, and a pair of abutments carried by said driving member and engageable with said brake member to urge the relieved portion thereof away from the surface of said bore when said driving member rotates in either direction, said two pairs of abutments being axially displaced from each other.

4. A reverse brake, comprising a stationary member having a circular bore, an annular brake member rotatable in said bore, said brake member being relieved exteriorly over somewhat less than half of its circumference, rotatable driving and driven members coaxial with said bore, said brake member being provided with opposite axially extending ribs disposed symmetrically relative to the relieved portion, each of said driving and driven members extending into said brake member from opposite directions, said driving member being provided with a pair of abutments positioned to engage said ribs respectively upon rotation of said driving member, both said abutments being located on the same side of said ribs as is said relieved portion, said driven member being provided with a pair of abutments positioned to engage said ribs respectively upon rotation of said driven member and located on the opposite sides of said ribs from said first named abutments.

WILLIAM K. CRESON.

REFERENCES CITED

The following references are of record in the file of this patent:

UNITED STATES PATENTS

| Number | Name | Date |
|---|---|---|
| 2,028,629 | Smith | Jan. 21, 1936 |
| 2,347,292 | Smith | Apr. 25, 1944 |
| 2,347,293 | Smith | Apr. 25, 1944 |
| 2,359,009 | Smith | Sept. 26, 1944 |
| 2,359,010 | Smith | Sept. 26, 1944 |